United States Patent
Jeldi

(10) Patent No.: US 12,509,747 B2
(45) Date of Patent: Dec. 30, 2025

(54) PROCESS FOR MAGNESIUM METAL EXTRACTION FROM MINERAL SOURCES

(71) Applicant: Magnesium Innovations Group Inc., Indianapolis, IN (US)

(72) Inventor: Bala Anand Jeldi, Carmel, IN (US)

(73) Assignee: Magnesium Innovations Group Inc., Indianapolis, IN (US)

( * ) Notice: Subject to any disclaimer, the term of this patent is extended or adjusted under 35 U.S.C. 154(b) by 0 days.

(21) Appl. No.: 19/076,331

(22) Filed: Mar. 11, 2025

(65) Prior Publication Data

US 2025/0207221 A1    Jun. 26, 2025

Related U.S. Application Data

(63) Continuation of application No. PCT/US2024/032702, filed on Jun. 6, 2024.

(60) Provisional application No. 63/510,214, filed on Jun. 26, 2023, provisional application No. 63/506,737, filed on Jun. 7, 2023.

(51) Int. Cl.
  *C22B 26/22* (2006.01)
  *C22B 1/24* (2006.01)
  *C22B 5/16* (2006.01)

(52) U.S. Cl.
  CPC ............ *C22B 26/22* (2013.01); *C22B 1/2406* (2013.01); *C22B 5/16* (2013.01)

(58) Field of Classification Search
  CPC .......... C22B 26/22; C22B 1/2406; C22B 5/16
  See application file for complete search history.

(56) References Cited

U.S. PATENT DOCUMENTS 4,033,759 A    7/1977    Johnston et al.
2014/0305346 A1*  10/2014  Neelameggham ........ C04B 2/10
                                                              423/155

FOREIGN PATENT DOCUMENTS

CN        2457173 Y   * 10/2001
CN     101967566 A      2/2011
(Continued)

OTHER PUBLICATIONS

Okhuysen, Victor. SF6 replacement evaluation in magnesium sand and investment casting. California Air Resources Board, Research Division, California Environmental Protection Agency, 2011. (Year: 2011).*

(Continued)

*Primary Examiner* — Keith D. Hendricks
*Assistant Examiner* — Moriah S. Smoot
(74) *Attorney, Agent, or Firm* — Faegre Drinker Biddle & Reath LLP

(57) ABSTRACT

The present disclosure is a metal extraction process that includes preparing a homogeneous admixture of metal oxide powder, reducing agent powder, and catalyst powder, pelletizing the admixture to yield a plurality of pellets, positioning the plurality of pellets in a cartridge, positioning the cartridge in a reducing chamber and heating the reducing chamber to a reducing temperature, pulling a partial vacuum in the reducing chamber, vaporizing desired metal from the plurality of pellets, condensing vaporized metal on a condensation surface positioned in a condensation chamber in pneumatic communication with the reducing chamber, cooling the condensation surface outside the condensation chamber, and removing condensed metal bodies from the condensation surface.

19 Claims, 14 Drawing Sheets

(56) References Cited

FOREIGN PATENT DOCUMENTS

| CN | 107083491 A | 8/2017 | |
|---|---|---|---|
| EP | 1204499 B1 * | 8/2006 | ............. C22B 9/006 |
| KR | 101235716 B1 * | 2/2013 | |
| KR | 101353454 B1 * | 1/2014 | ................ F27B 1/10 |
| WO | WO-2018001265 A1 * | 1/2018 | ............. C22B 26/22 |

OTHER PUBLICATIONS

KR-101353454-B1 Trans-English Language Translation (Year: 2014).*
KR-101235716-B1 Trans-English Language Translation (Year: 2013).*
EP-1204499-B1 Trans-English Language Translation (Year: 2006).*
CN-2457173-Y Trans-English Language Translation (Year: 2001).*
Guo, Junhua, et al. "Kinetics of Extracting Magnesium from Dolomite by Aluminothermic Process in Flowing Argon." JOM 75.7 (2023): 2614-2625. (Year: 2023).*
WO-2018001265-A1 Trans (English Language Translation) (Year: 2018).*
International Search Report and Written Opinion from PCT/US2024/032702 dated Sep. 10, 2024.

\* cited by examiner

PROCESS FOR MAGNESIUM METAL EXTRACTION FROM MINERAL SOURCES

CROSS-REFERENCE TO RELATED DISCLOSURES

This Application is a continuation of International Application No. PCT/US2024/032702 filed Jun. 6, 2024, which claims benefit of U.S. Provisional Patent Application No. 63/506,737 filed on Jun. 7, 2023 and U.S. Provisional Patent Application No. 63/510,214 filed on Jun. 26, 2023, each of which are fully incorporated herein in entirety by reference.

FIELD OF DISCLOSURE

The present invention relates to the devices and methods for extracting metals from deposits in minerals and, more particularly, to a method for extracting magnesium from minerals.

BACKGROUND

Currently, most magnesium is produced using the Pidgeon process. In the Pidgeon process, dolomite is mixed with ferrous silica and calcium fluoride. Dolomite is typically provided as a mined material, ferrous silica is added as a reducing agent, and calcium fluoride functions as a catalyst.

These three materials (dolomite, ferrous silica, and calcium fluoride) are mixed together in predetermined proportions to yield a homogeneous admixture and then powdered. The resultant powdered admixture is then compressed into pellets and the pellets are then fed into a smelter and heated under vacuum in a reduction tank to yield thermally reduced metallic magnesium.

A typical smelter has three chambers, including a heating chamber, a separator chamber and a condenser. The heating chamber typically heats the material to about 1200° C. under vacuum.

The admixture is usually heated up for about 8-12 hours to drive the magnesium out of the dolomite as a vapor. The resultant magnesium vapor passes through the separator, and ultimately into the condenser. In the condenser, the vaporized magnesium condenses to form metallic magnesium crowns. At the end of the process, most of the magnesium is removed from the dolomite, and is caked onto the condenser in a crown-like formation of magnesium.

When the door of the smelter is opened at the end of the process, there exists a crown type formation of magnesium that is removed by hand. The separator is removed, and then the pellets are removed. At this point, the residual pellets are basically calcium pellets that do not contain much useful, removable magnesium.

Although the Pidgeon process described above is useful in producing magnesium, room for improvement exists. In particular, the Pidgeon process is energy inefficient and labor intensive, among other things.

The inherent high labor and energy costs associated with the Pidgeon process currently make its use to generate metallic magnesium economically impractical in developed, high labor cost countries such as the United States, Europe, Japan, and South Korea.

Current Pidgeon process devices of the type employed in magnesium producing countries often use coal as a heating source. Although coal has its benefits and provides a relatively inexpensive source of heat, it is also difficult to work with and can be environmentally unfriendly unless expensive pollution control devices are employed therewith, which is typically not the case.

Another problem with the Pidgeon process is that the currently employed pellets are placed into the chamber manually in a manner that requires them to be manually removed with labor intensive devices such as shovels. Further, the crowns of magnesium must usually be shoveled out of the chamber of the smelter.

As practiced currently, the Pidgeon process has significant inefficiencies. For example, since the magnesium removal process softens the pellets, they must be shoveled out of the interior of the smelter. The smelter cannot be used to create another batch of material during the time that the smelter is being cleaned between batches. Unfortunately one of the things that increases the cleaning time of the smelter is that the smelter is often at a temperature of about 1200° C. after a batch of dolomite is processed. Because of this heat, time must be allotted to allow the smelter to cool down to a temperature at which it can be worked on, adding to both cycle time and energy costs arising from always having to start a new cycle from room temperature.

Finally, the process currently used today is rather slow. Typically, it takes about 12 hours to process one batch within a currently existing smelter.

Therefore, there remains a need for an improved metal extraction process capable of producing metal, such as magnesium, from precursor mineral feed, in an energy and cost-efficient manner, among other things.

SUMMARY OF THE DISCLOSURE

In accordance with the present disclosure, a magnesium extractor apparatus and process for using the same includes a housing enveloping a heating chamber portion and a condenser-separator portion. A cartridge for containing a plurality of dolomite pellets is removably insertable into the heating chamber. At least one removably insertable separator member is removably insertable into the separator chamber portion and a removably insertable condenser-receiver module is removably insertable into condenser-receiver chamber portion.

The separator member typically includes a plurality of separator plates having perforations through which vaporous magnesium can pass, but non-vaporous magnesium and like particles cannot pass. The condenser-receiver preferably comprises a condenser plate upon which the vaporous magnesium can condense into metallic magnesium particles.

In one embodiment, the cartridges are configured to permit the dolomite raw material, typically configured as pellets, to be loaded into the cartridge and placed into/removed from the heating chamber.

In another embodiment, the heating chamber, separator chamber, and condenser chamber are all removable from the housing or processing cylinder along a rail member, which permits them to be automatically slid into the interior of a processing tube, and automatically removed from the processing tube.

These and other features of the present disclosure will become apparent to those skilled in the prior art upon a review of the detailed description and drawings represented below.

BRIEF DESCRIPTION OF THE DRAWINGS

Corresponding reference numerals are used to indicate corresponding parts throughout the several views.

DETAILED DESCRIPTION

Figure 1:
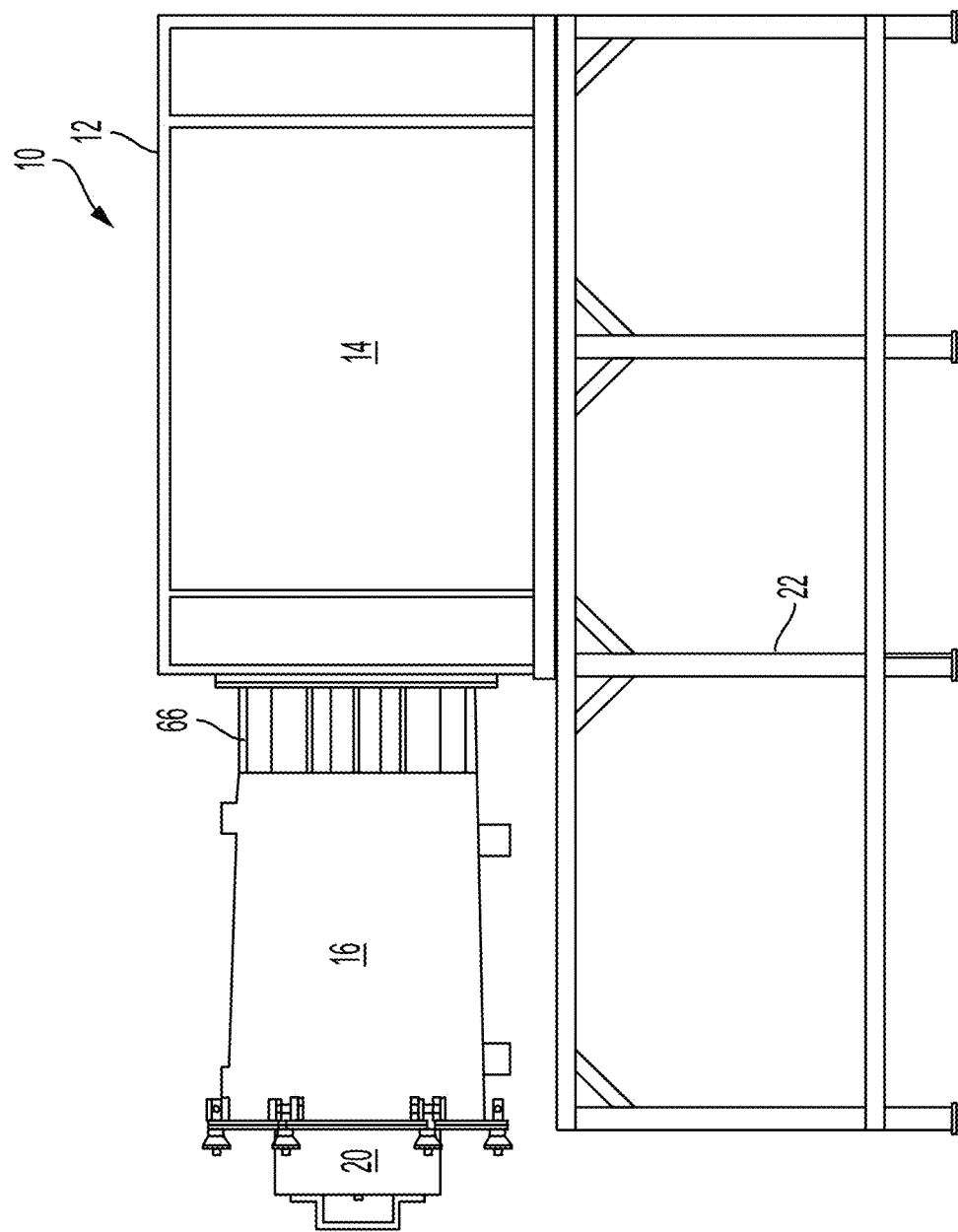
FIG. 1 is a sideview of the magnesium processing device of the present disclosure.

Before the present methods, implementations, final and intermediate compositions, and systems are disclosed and described, it is to be understood that this invention is not limited to specific synthetic methods, specific components, implementation, or to particular compositions, and as such may, of course, vary. It is also to be understood that the terminology used herein is for the purpose of describing particular implementations only and is not intended to be limiting.

As used in the specification and the claims, the singular forms "a," "an" and "the" include plural referents unless the context clearly dictates otherwise. Ranges may be expressed in ways including from "about" one particular value, and/or to "about" another particular value. When such a range is expressed, another implementation may include from the one particular value and/or to the other particular value. Similarly, when values are expressed as approximations, for example by use of the antecedent "about," it will be understood that the particular value forms another implementation. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not. Similarly, "typical" or "typically" means that the subsequently described event or circumstance may occur often, although there may be circumstances where it may not occur, and that the description includes instances where said event or circumstance occurs and instances where it does not.

Referring now to FIGS. 1-11, one embodiment of a magnesium extractor 10 is illustrated along with an exemplary controller for the magnesium extractor 10. The magnesium extractor 10 includes a housing 12, that includes a heating block 14 and a condenser-separator 16. The heating block 14 is typically thermally insulated and defines an interior 15 that serves as a reduction chamber.

The condenser separator 16 also defines an interior 18 into which separating screens 86 and a cylindrical receiver 90 are placed, to serve as the separating portion and the condensing receiving portion of the magnesium extractor 10.

An openable door 20 is disposed at the end of the condenser-separator portion 16 that allows access into the interior 18 of the condenser-separator portion, along with allowing access into the interior 15 of the heating box 14. The interior 18, 15 may comprise two portions of the same larger interior space. However, due to the difference in functions performed in the various interiors, it will also be understood that during operation a significant temperature differential typically exists between the relatively hotter interior 15 of the heating box 14, and the significantly cooler interior 18 of the condenser-separator portion 16.

A stand 22 is provided upon which the magnesium extractor 10 is placed. The stand 22 positions the extractor 10 at a height that is convenient for operating the device 10.

Figure 1A:
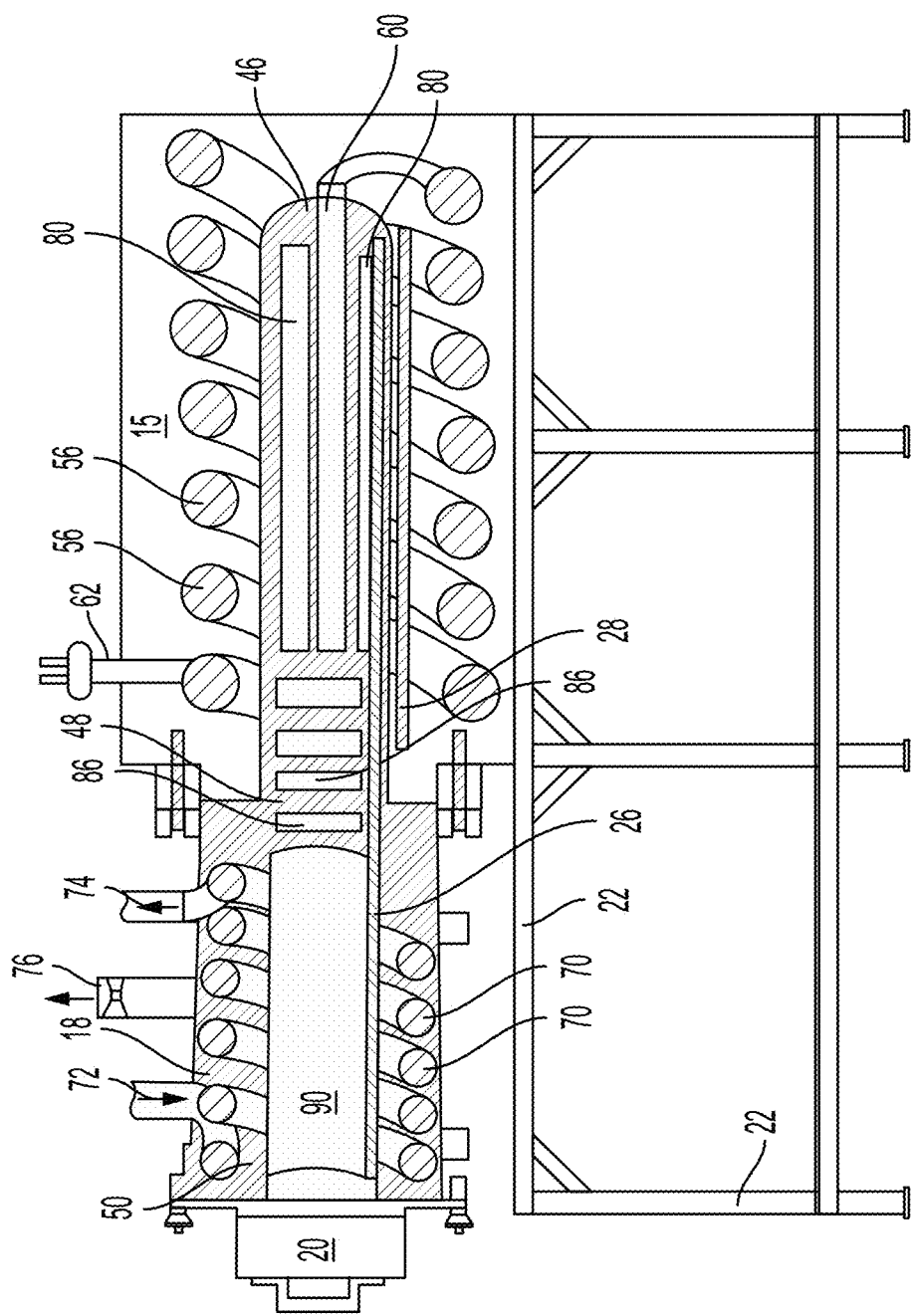
FIG. 1A is a side interior view of the magnesium processing device of FIG. 1.
Figure 1D:
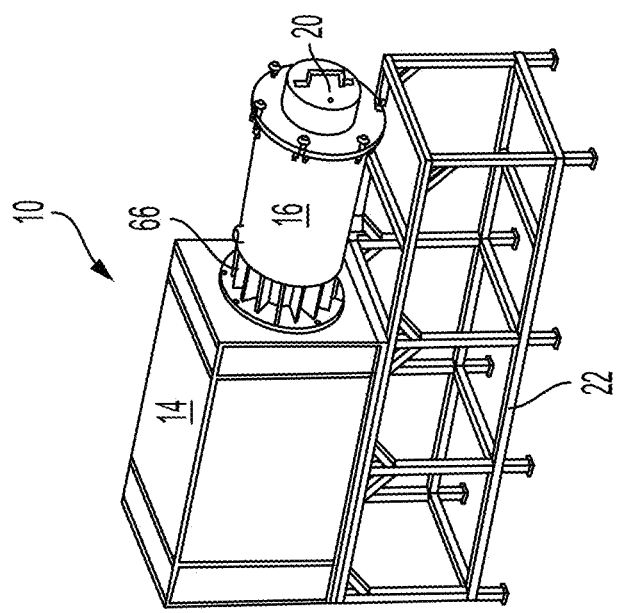
FIG. 1D is a rear side perspective view of the magnesium processing device of FIG. 1.
Figure 1C:
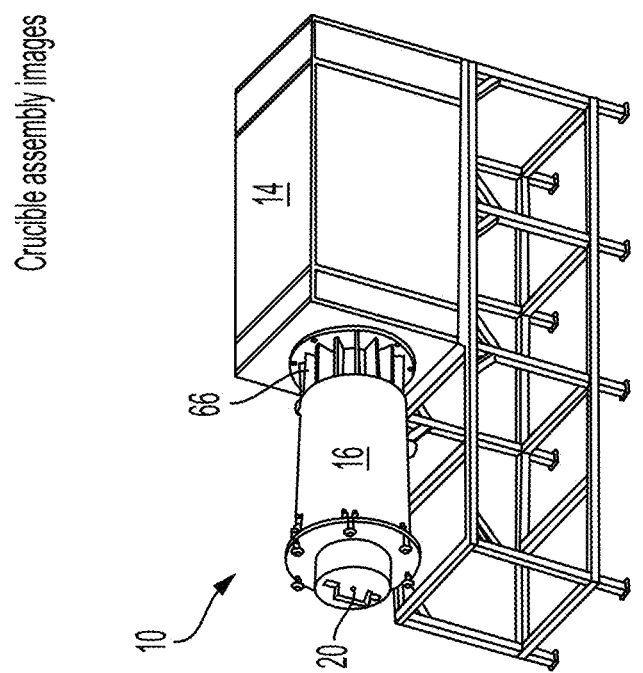
FIG. 1C is a front side perspective view the magnesium processing device of FIG. 1.
Figure 1B:
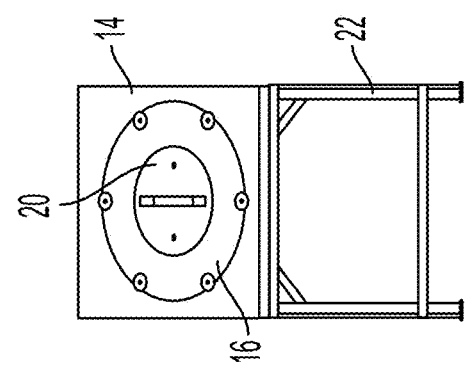
FIG. 1B is an end view of the magnesium processing device of FIG. 1.
Figure 2:
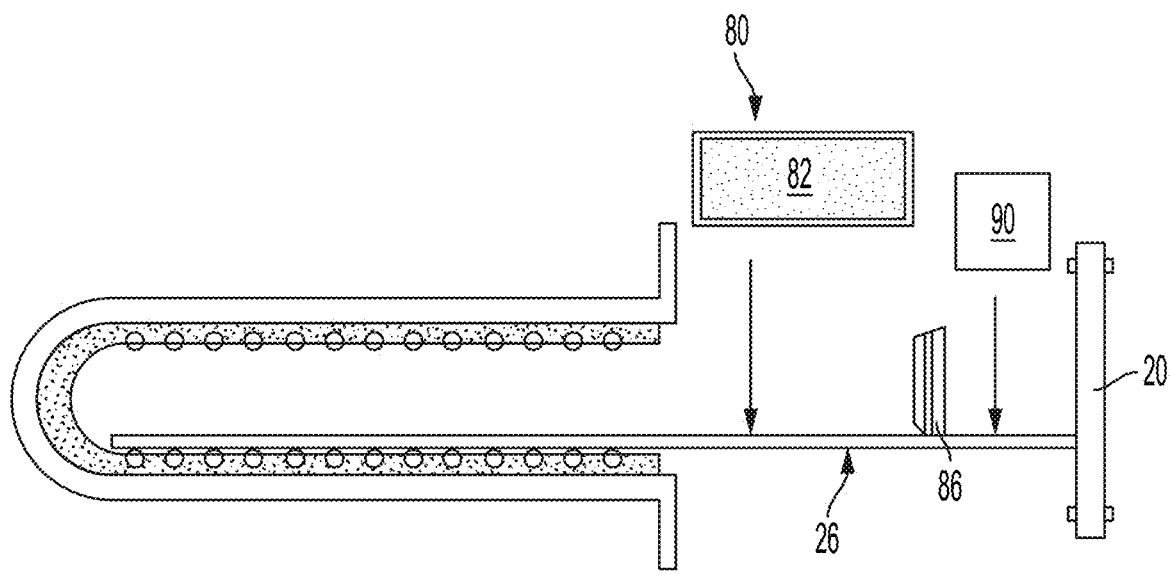
FIG. 2 is a side, schematic view of a processing cylinder of the present disclosure.
Figure 3:
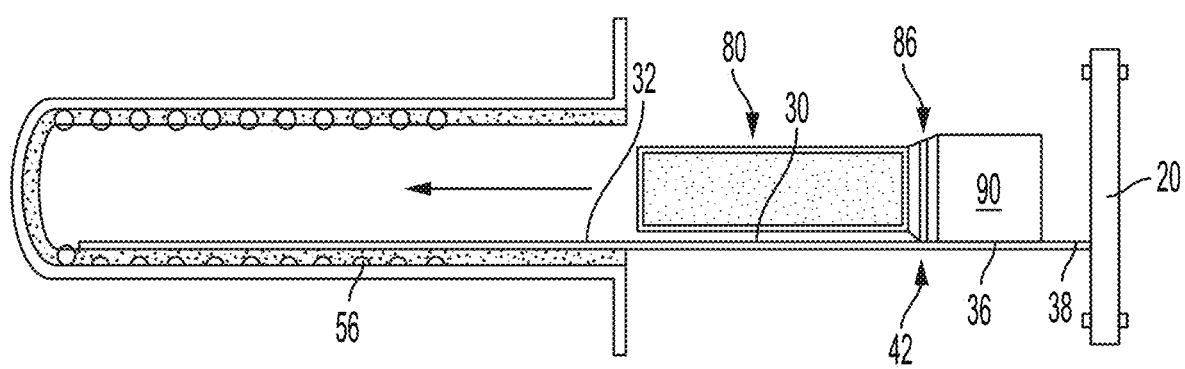
FIG. 3 is a sectional view of the processing cylinder of FIG. 2, showing chamber members removed therefrom.
Figure 4:
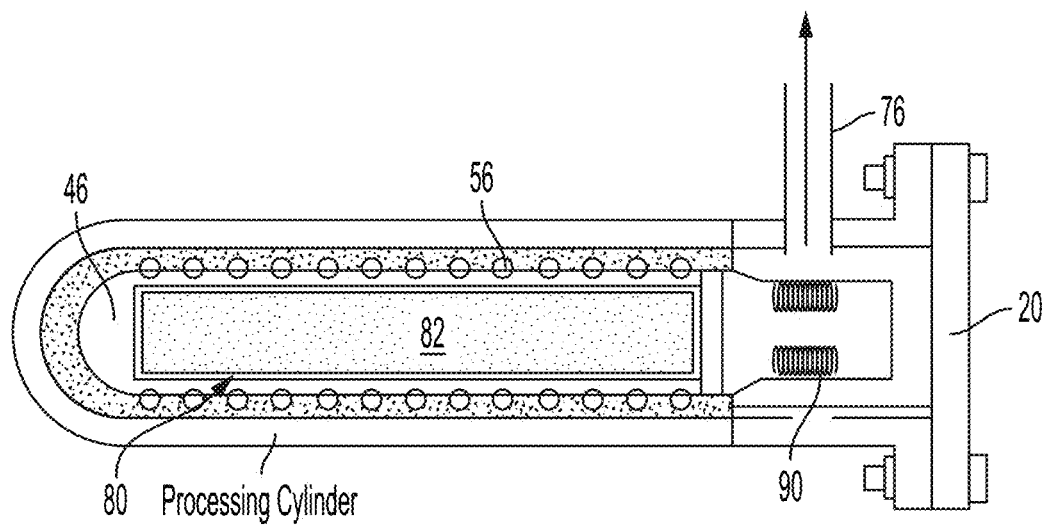
FIG. 4 is a sectional view of the chamber member showing the cylinder pellets inserted within the interior of the processing cylinder.

Removable platform 26 is positioned to be linearly slidable along one or more rail 28 enabling the removable platform 26 to be moved between a position wherein the platform 26 is largely outside the interior 15, 18 of the chamber, as shown in FIGS. 2 and 3, and a position wherein platform 26 is positioned within interior 15, as shown in FIGS. 1A and 4.

The removable platform 26 includes a heating portion 30 (also called heat source 30) that is disposed adjacent to the first end 32 of the removable platform 26. The heat source 30 is typically provided as electrically resistive heating coils 56 although heat source 30 may be inductive, arc, gas, hybrid, or the like or any convenient heat source or combination of heat sources disclosed herein. A heat sink portion 66 is in thermal communication with the condenser-separator 16 to provide additional surface area for air to help to cool the condenser-separator 16.

A water jacket coil 70 is connected in thermal communication with condenser-separator 16 and typically includes a water inlet port 72 and a water outlet port 74. Water flows into the inlet 72, through the water jacket coil 70, and out the outlet 74. Water within the water jacket 70 is provided for cooling the condenser-separator 16, to help maintain a desired target temperature differential between interior 15 and interior 18 so as to accelerate the condensation of the magnesium vapor on the receiver 90.

Figure 1E:
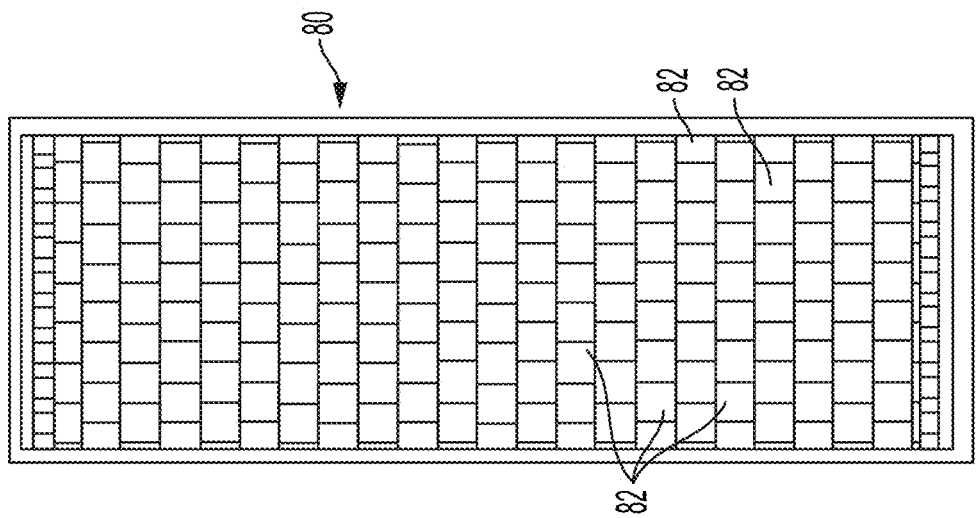
FIG. 1E is a top view of a cartridge containing a plurality of dolomite pellets.
Figure 1F:
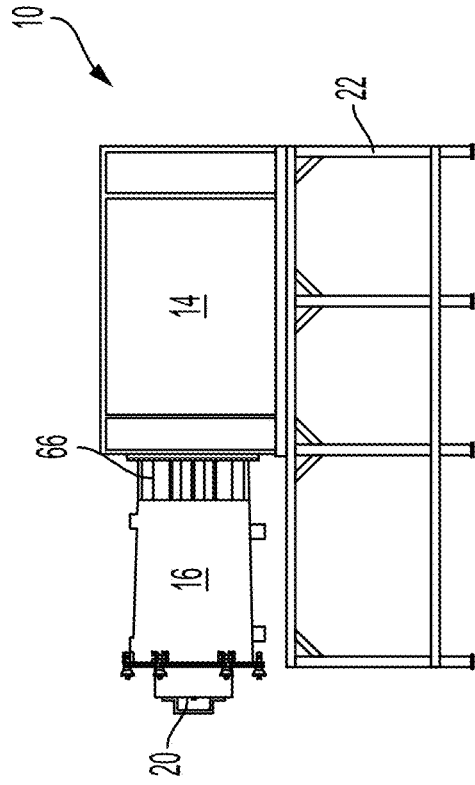
FIG. 1F is a side view of the magnesium processing device of FIG. 1.

A pellet cartridge 80 is shown in FIG. 1E and 1A as being configured to hold a plurality of dolomite pellets 82. The pellet cartridge 80 is typically configured to be cylindrical, with a hollow axial passage way therethrough for receiving the central heating coil 60. In one embodiment, the pellet cartridge 80 is configured to hold a plurality of unprocessed dolomite pellets 82. However, this disclosure contemplates applying the teachings discussed herein to other materials other than dolomite as well.

One of the benefits of the cartridge 80, is that it may be removed from the device 10 by removing cartridge 80 from the removable platform 26 when the removable platform 26 is removed from the interior 15 of the magnesium extractor 10. Rather than requiring the pellets 82 to be shoveled out of the heating chamber 15, the cartridge 80 can be removed from the platform 26 and placed in a heating box 98 (see FIG. 5A) to help heat fresh pellet cartridges 80 laden with unprocessed dolomite or other magnesium carrying material.

The separator 16 includes a plurality of separator screens 86. The separator screens 86 are configured to allow magnesium vapor to flow therethrough while catching larger particulate contaminants.

A cylindrical receiver 90 is disposed in the condenser receiver chamber 50, and defines a surface upon which the magnesium vapor can condense onto metallic magnesium crowns. The separator screens 86 and cylindrical receivers 90 are both removably coupled to the removable platform 26, so that upon removing the removable platform from the interior 15, the cylindrical receiver 90 and screens 86 can be moved to another location at which the magnesium crowns can be later removed from the cylindrical receiver 90.

Figure 5:
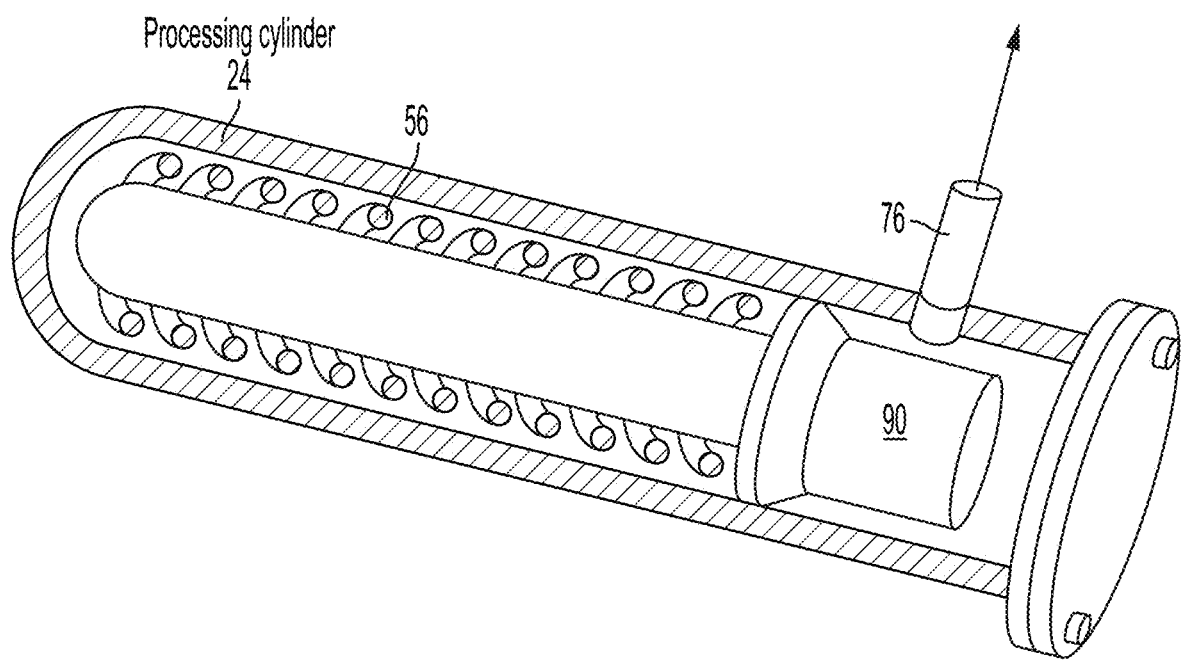
FIG. 5 is a schematic view showing dolomite pellets in the heating chamber.
Figure 5A:
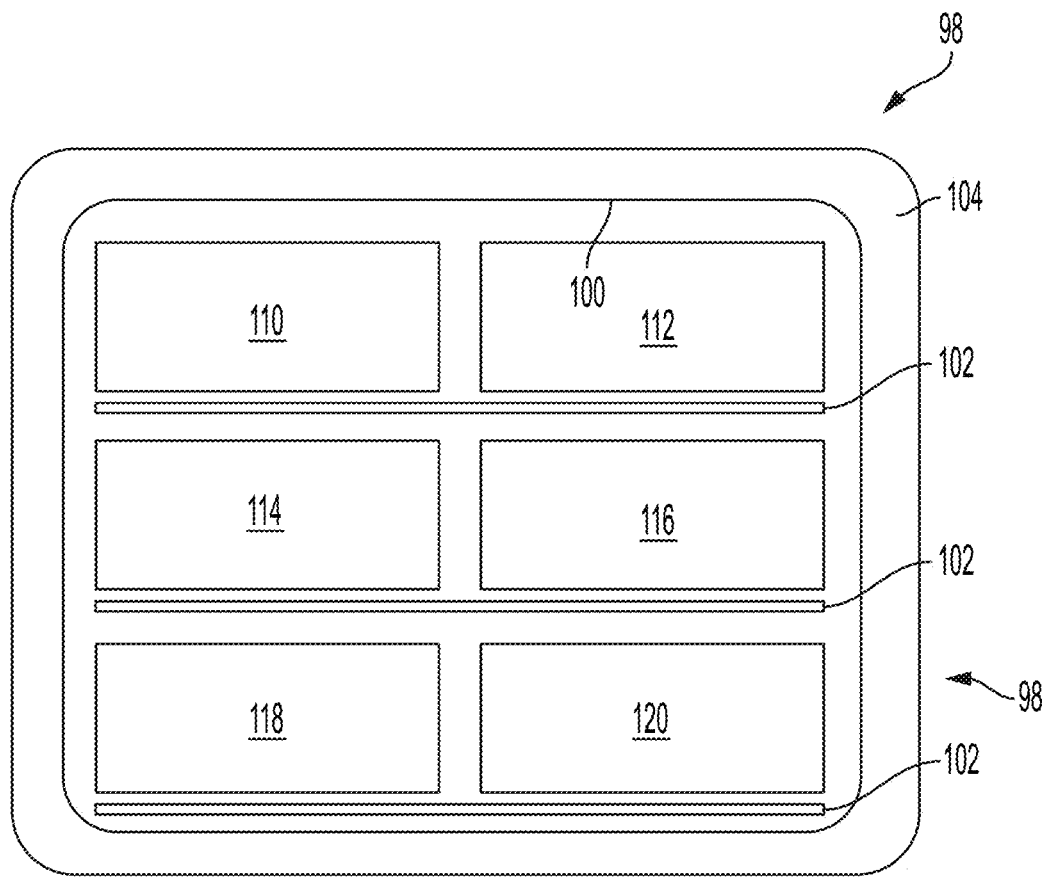
FIG. 5A is a side view of a cartridge heat transfer box of the present disclosure.

Turning now to FIG. 5A, a hot box 98 of the present disclosure is shown. The purpose of the hot box 98 is to preheat the pellet cartridge 80, and the pellets 82 contained therein, so that they are at an elevated temperature when they are placed into the heating chamber portion 48 of the magnesium extractor 10, among other things.

The hot box 98 typically includes an interior chamber, which may include a plurality of racks 102 on which the pellet cartridges 110, 112, 114, 116, 118, 120 rest. The wall 104 of the hot box 98 is thickened and thermally insulated to help retain heat within the interior 100 of the hot box 98.

Within the hot box 98 is room for a plurality of pellet cartridges. In the sample shown in FIG. 5A, space is provided for six pellet cartridges, including first unprocessed pellet cartridge 110, second unprocessed pellet cartridge 112, third unprocessed pellet cartridge 114, fourth unprocessed pellet cartridge 116, fifth processed pellet cartridge 118, and sixth processed pellet cartridge 120. However, this disclosure contemplates providing a hot box 98 that can accommodate more or fewer pellet cartridges, and FIG. 5A illustrates only one contemplated embodiment.

One differences between the pellet cartridges are that some pellet cartridges 118, 120 contain dolomite or other material that has already been at least partially processed, and some pellet cartridges 110, 112, 114, 116 contain unprocessed dolomite or other material. As will be appreciated, the processed cartridges 118, 120 are placed in the hot box 98 after they are taken out of the magnesium extraction device 110. When so removed, the cartridges 118, 120 are generally at an elevated temperature, and may be close to around 1200° C., the temperature at which heating chamber 14 may operate. The hot processed pellet cartridges 118, 120 are placed in the hot box 98 interior to contribute heat to the interior so as to impart heat to the unprocessed cartridges 110, 112, 114, 116, among other reasons.

When the unprocessed cartridges 110, 112, 114, 116 are placed into the box 98, they are typically at room temperature. As discussed above, cartridges 110, 112, 114, 116 will ultimately need to be heated to approximately 1200° C. when under an appropriate vacuum. Nonetheless, a significant amount of heat energy will need to be imparted to the unprocessed cartridges 110, 112, 114, 116 to raise their temperature up to the desired operating temperature of about 1200° C.

By placing the unprocessed cartridges 110, 112, 114, 116 into the hot box with the hotter processed cartridges 118, 120, the heat from the processed cartridges 118, 120 will preheat the unprocessed cartridges 110, 112, 114, 116.

The degree to which the processed hotter cartridges 118, 120 will be able to raise the temperature of the unprocessed cartridges 110, 112, 114, 116 will depend on a variety of factors, such as the number of processed cartridges that are in the hot box 100, as a percentage of the total number of cartridges; and the temperatures of the processed cartridges 118, 120 when they were placed in the hot box. Further, the amount of time that the processed cartridges 118, 120 have been in the hot box, which will be representative of the then current temperature of the processed cartridges 118, 120, may affect the temperature of the hot box 98.

Regardless, under certain circumstances the processed cartridges will typically be able to raise the temperature of the unprocessed cartridges somewhere between about 500 degrees and 900 degrees. As will be appreciated, any energy that is given off by the processed cartridges 118, 120, and which is absorbed by the unprocessed cartridges 110, 112, 114, 116 represents heat energy that does not have to be added by the heating chamber 46, which thus reduces the energy input costs of operating the magnesium extractor device 10 and increase the efficiency of the system 10, among other things. Additionally, by starting at a relatively elevated temperature, it will take less time for the unprocessed pellet cartridges to reach the point where the magnesium is hot enough to vaporize out of the cartridges, thus reducing processing cycle time and increasing efficiency in the process, among other things.

As discussed above, magnesium extraction system 10, and in particular the condenser-separator 16, includes an openable door 20 at one end. The interior of the system 10 includes three chambers, including the heating chamber portion 46, the separator portion 48, and the condenser-receiver portion 50.

The heating chamber 46, also called the reduction chamber 46, is configured to generate high temperatures. Heating chamber 46 typically includes heating coils 56 or like heat source 56 that is disposed exteriorly of the heating chamber 46, or interiorly of the heating chamber 46 adjacent/close to the wall of the heating chamber portion 46.

The heating chamber 46, along with the separator chamber 48 and the condenser-receiver chamber 50 typically operate under a vacuum. Preferably, a vacuum pump is connected thereto, such as by port 76, in pneumatic communication therewith to pull an about 10-4 mBar vacuum. However, other vacuum levels are considered herein as well. The heating chamber 46 is also capable of being heated up to about 1200° C. or more. Nonetheless, the heating chamber 46, separator chamber 48, and condenser-receiver chamber portion 50 typically operate at different temperatures.

The pellet cartridges 80 that include unprocessed dolomite, or other material, pellets are placed into the reduction chamber 46. The cartridge 80 is typically cylindrical in configuration and more typically includes a hollow passageway running axially therethrough.

Once the cartridge 80 is emptied, it is refilled with dolomite, or other material, pellets 82. The dolomite pellets 82 contained in the cartridge 80 are placed into the heating coil reduction chamber portion 46. At this point, the pellets may be referred to as a dolomite precursor because they contain dolomite, ferrous silica and calcium fluoride. However, other materials are also considered herein for the pellets 82 of the cartridge 80.

The cylindrical cartridge 80 is inserted into the chamber of cylindrical receiver 24, and the central axial passageway of the cylindrical typically receives a spear-like electrical probe 60 which imparts heat to the interior surface of the cylindrical cartridge. This use of the interior, spear like electrical heater 60 enables the cartridge 80 to be heated from the interior in concert with being heated externally by the heating tubes 56.

When the pellets are dolomite, it is noted that dolomite is a ceramic material and is very slow to heat. Therefore, the present disclosure is able to heat the dolomite cartridge 80 as quickly as possible, to get the dolomite precursor up to a point wherein the magnesium can be vaporized. Further, by increasing the vacuum or otherwise lowering the atmospheric pressure within the chamber, vaporization of magnesium from the dolomite precursor is expedited.

The cartridge 80 is typically made of a specialized refractory steel, such as chrome steel 430, a refractory ceramic material, a refractory composite material, or the like, because normal steel will tend to oxidize at about 800 degrees Celsius, which is below the target 1200 degree Celsius operating temperature to which the dolomite precursor is desired to be heated. The cartridge 80 itself is typically made of a refractory steel composition so as to withstand the 1200° C. temperature of the heating box.

The separator 86 may include a plurality, such as three, of perforated plates 86. One purpose of the separator plates 86 is to maintain the heat within the heating chamber 46, and to reduce the amount of heat conducted into the condenser-receiver chamber portion 50, among other things.

The separator chamber plates 86 are typically be made of a refractory steel similar to that used for the cartridges 80. The plates 86 are typically designed to help resist the intrusion heat into the condenser-receiver chamber 50. However, the plates 86 are also perforated so that magnesium vapor can pass through the separator plates 86, and into the condenser-receiver chamber 50.

The condenser-separator portion 16 is preferably also made of the specialty steel or like refractory material capable of withstanding the 1200° C. temperature given off by the heating box. The condenser-receiver chamber 50 includes a cylindrical receiver 90 which serves as a surface upon which the magnesium vapor can condense into metallic magnesium crowns.

The cylinder 90 is removable so that it can be disengaged from the platform 28 and taken to a separate area wherein the crowns can be removed from the cylindrical receiver 90. The metallic magnesium crowns cool on the cylinder, and form on the surface of the cylindrical receiver 90. At the end of the process, the cylinder 90 is removed from the device 10, and magnesium crowns are removed from the cylinder 90.

Generally, the processing of the magnesium is done on a batch, rather than a continuous basis. For example, a user may start with an empty chamber, and then first load the pellet cartridge 80 into the chamber 46, followed by the separator plates 86 and the cylindrical receiver 90. Once they are loaded, the user may heat up the heating chamber to around 1200° C. with the water jacket 70 running to keep the condenser-receiver chamber 50 at a much lower temperature, to help foster the condensation of the magnesium fumes into magnesium crowns. Concurrently, the user may begin operation of the vacuum so as to pull an appropriate vacuum on the interior of the device 10, for example 5-200 Torr, 10-100 Torr, 25-75 Torr, 40-60 Torr, and or about 50 Torr.

The pellets 82 and cartridges 80 are left within the chamber 46 of the device 10 for suitable periods of time under both heat vacuum to extract a desired amount of magnesium metal from the pellets.

In one embodiment of the disclosure, a suitable cycle period may be approximately 4-5 hours. At the end of the cycle, the device 10 is turned off and the separator plates 86, cartridge 80, and cylindrical receiver 90 are removed. The cylindrical receiver 90 is removed to remove the magnesium crowns from it to obtain the magnesium metal. The separator plates 86 may need to be cleaned, as they will also tend to accumulate magnesium crowns on them. The separator plates 86 can be removed from the platform, and taken to an area where they can be cleaned and fresh, clean plates 86 may be inserted.

The spent pellet cartridges 80, when removed after a cycle, primarily comprise quasi-dolomite or other material-like residue from which a significant portion of the magnesium has been removed.

The processed cartridges, such as cartridges 118, 120 when removed, have a fairly low quantity of useful, removable magnesium contained therein. These processed cartridges 118, 120 are then taken to the hot box 98.

As shown in FIG. 5A, the hot box 98 includes a plurality of cartridges, some of which are unprocessed cartridges, such as 110, 112, 114, and 116, and some of which are processed cartridges 118, 120. The hot, processed cartridges 118, 120 are placed into the hot box 98 after being removed from the device 10. Within the hot box 98, the hot processed cartridges 118, 120 heat the cooler, unprocessed cartridges 110, 112, 114, 116, from their initial temperature, typically room temperature.

In one embodiment, the hot processed cartridges 118, 120 are able to raise the temperature of unprocessed cartridges from about an initial temperature of about 25° C. to several hundred degrees Celsius, which thereby reduces the amount of added heat required to raise the temperature of the unprocessed cartridges to the 1200° C. temperature required vaporize magnesium bound in dolomite.

During operation, the condenser chamber 50 may be kept at about 300°-400° Celsius. This 300°-400° Celsius temperature is achieved both in the manner in which the heating chamber 46 is thermally insulated from the condenser-receiver chamber 50 by the separator chamber 48 containing separator plates 86.

Additionally, the use of a cold water jacket 70 also helps to reduce the temperature of the condenser-receiver chamber 50. The separator chamber 48 is typically around 400° C. to 900° C. It is cooler than the heating chamber 46 because no direct heat is being applied to the separator chamber 48 among other reasons. Additionally, the heat sink features 66 also helped to dissipate heat from the separator chamber portion 48 among other things.

Another factor that helps to keep the condenser-receiver portion and separator chamber portion 48 cool, is that both are disposed outside of the primary heating box 14 wherein heat is applied to the pellets 82.

In one aspect of this disclosure, a hook and pusher system is employed to move the removable platform 26 or rack into and out of the heating chamber 46, separator chamber 48, and condenser-receiver chamber 50. The platform 26 or any of the components, such as the condenser-receiver, cylindrical receiver 90, separator screens 86, and pellet cartridge 80 can have islets on this so that one can engage a hook within the islet, and use the hook and islet connection to either push the items into the chamber, or remove them from the chamber. In one embodiment, the three members, including the pellet cartridge 80, separator screens, and cylindrical receiver 90 are operationally connected so that they can be inserted and removed as a unit.

Any convenient refractory removal tool may be employed to remove the items, 80, 86, 90 from the device, as they are at elevated temperature and should not be touched directly by a hand, or even a hand contained in an insulated glove.

It has been found that an effective way for removing the magnesium crowns from the cylindrical receiver 90 is to take the cylinder 90 to a shaker table, and shake off the crowns. Preferably, this can be done without resorting to having to scrape off the crowns from the receiver 90. The separator plates 86 can also have any magnesium deposited thereon removed by the same process by placing them on a shaker table and then having the crowns shaken off.

The pellets 82 are generally very easy to remove from the cartridge 146. The cartridge 146 typically includes a door or port at one of its ends. When the door is open, one can load the unprocessed dolomite or other material onto the cartridge and then close the door, and place it into the magnesium extraction device. At the end of a cycle, the cartridge 146 can be pulled out and taken to the hot box 98 and used, as described above, to heat unprocessed cartridges 110, 112, 114, 116.

When the cartridge has cooled to an appropriate temperature, the door of the cartridge can be opened, and the pellets of the spent dolomite or other material can be poured out. At this point, the processed dolomite generally has a powder form, and so therefore, it will usually come out of the cartridge relatively easily. After removal, the spent dolomite or other material can then be used in one of a variety of products, such as being used to make concrete among other potential uses.

Figure 5B:
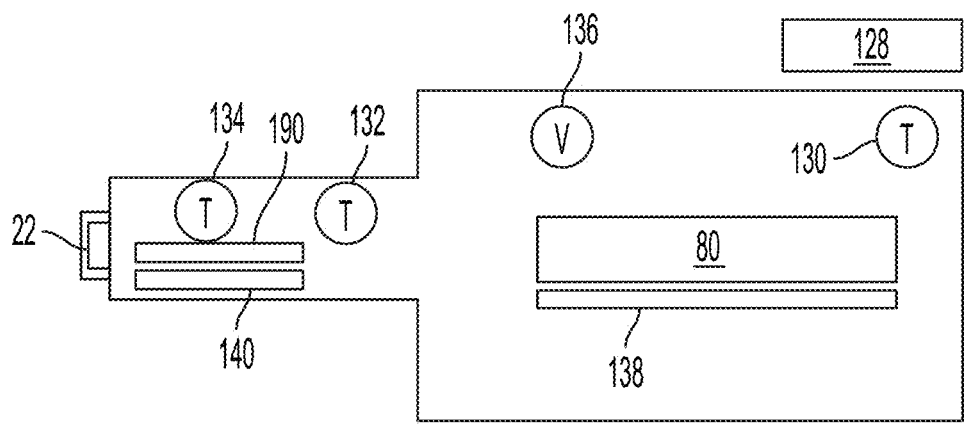
FIG. 5B is a schematic view of the controller for the device and associated components.
Figure 6:
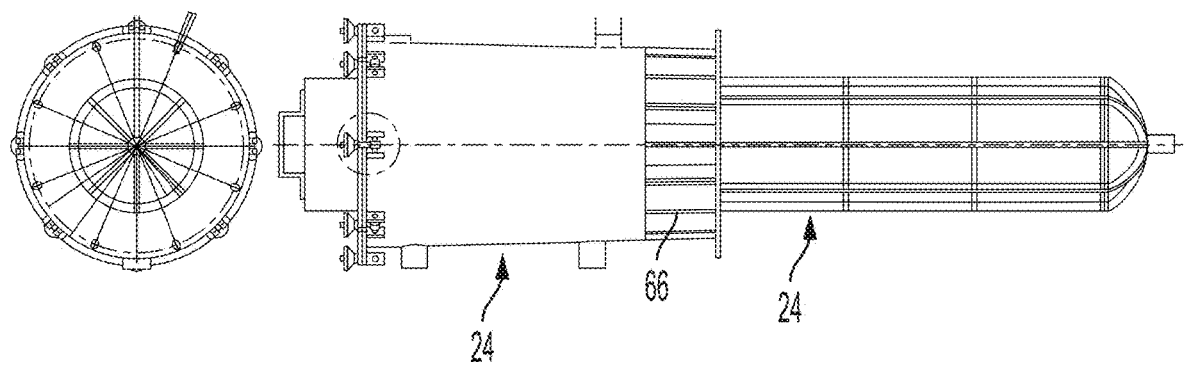
FIG. 6 is a side view of the cylinder of the present disclosure.
Figure 7:
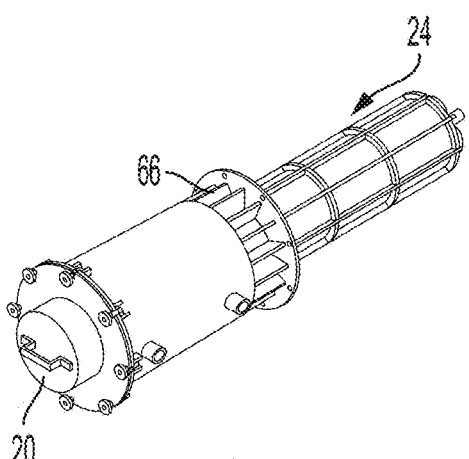
FIG. 7 is a perspective view of the processing cylinder of the present disclosure.
Figure 8:
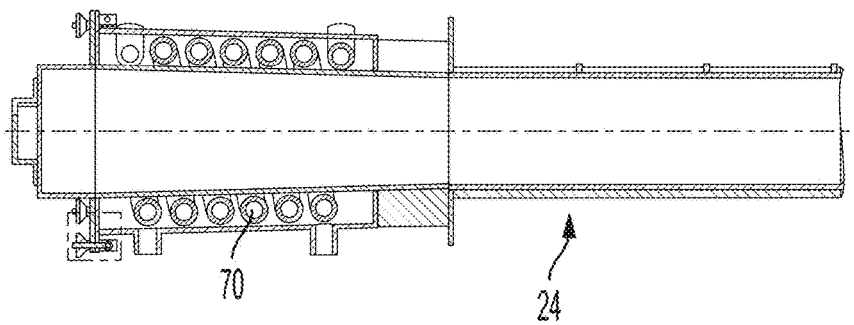
FIG. 8 is a sectional view taken along lines A-A of FIG. 9 of the processing of the processing cylinder.
Figure 9:
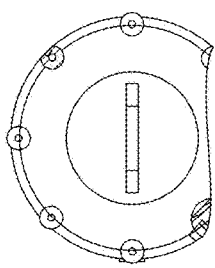
FIG. 9 is an end view of the processing cylinder of the present disclosure.
Figure 10:
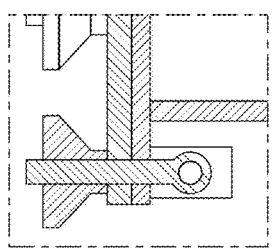
FIG. 10 is a detailed view of the area inscribed by Area B of FIG. 8.
Figure 11:
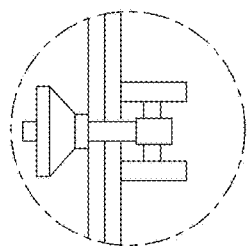
FIG. 11 is a detailed view of the Area C of FIG. 11.

Control device 128 is also provided, which is shown schematically in FIG. 5B. The controller 128 is operatively coupled to a plurality of sensors. The sensors include a first temperature sensor 130 positioned in the heating chamber 46, a second temperature sensor 132 positioned in the separating chamber 48, and a third temperature sensor 134 positioned in the condenser-receiver chamber 50. A vacuum sensor 136 is provided for measuring atmospheric pressure within the interior 46 of the heating chamber.

Additionally, a first scale 138 can be provided for the pellet cartridge 146. The first scale 138 is used for determining the weight of the pellet cartridge 146. A second scale 140 is provided for weighing the cylindrical receiver 190, so that one can determine the progress of the process. Based on predetermined factors, one can determine that the process is over, such as when the weight of the pellet cartridge reaches a certain percentage of its original weight or when the rate of weight change drops below a predetermined value, or the like, thus indicating that the appropriate amount of magnesium has been vaporized from the dolomite or other material.

As alluded to, the weight of the cartridge 146 and receiver 90 should be taken prior to placement of the cartridge 146 into the chamber, so that one will have a reference point to determine when the appropriate amount of magnesium has been removed from the pellets 82 within the pellet cartridge 80.

In one aspect of this disclosure about 80% of the available magnesium metal within a quantity of dolomite is typically recoverable by the present invention.

The primary ongoing function of the controller 128 is to control the heating coil. The controller 128 senses the temperature within the heating chamber 46, and controls the operation of the heating coils 56 so that the heating coils are activated to add heat when the temperature within the heating chamber falls to below 1200° C., and turns off the heating coil 56 when the temperature rises above 1200° C. In one aspect of this disclosure it may take somewhere between 6 and 8 hours to fully process a batch of dolomite to cook off all of the reasonably available magnesium.

Methodology

Minerals containing mineral oxides, such as dolomite [$CaMg(CO_3)_2$], magnesite [$MgCO_3$], magnesium chloride [$MgCl_2$], brucite [$Mg(OH)_2$], brushite [$CaHPO_4 \cdot 2H_2O$], hematite [$Fe2O3$], huntite [$Mg_3Ca(CO_3)$], calcium aluminates, combinations thereof, and the like may have one or more metallic constituents extracted therefrom using the above-described apparatus 10. As discussed herein and illustrated in FIGS. 12 and 13, examples focus on the reduction of dolomite to extract metallic magnesium therefrom; however, the invention is not limited to the extraction of metallic magnesium from dolomite and other minerals and oxide blends may be reduced using the inventions discussed herein to extract metallic magnesium and/or other metals therefrom.

Examples

Dolomite is reduced according to the equation $$3(MgO \cdot CaO) + CaC_2 => 3Mg + 4CaO + 2CO \qquad (1)$$

and magnesite is reduced according to the equation $$MgCO_3 + CaC_2 => Mg + CaO + 2CO \qquad (2)$$

at about 1200 degrees Celsius and under a sufficient vacuum, such as between about 50 and 250 Torr, more typically about 150 Torr. Heat is introduced to the system, typically through a 'green' or energy renewable source powering a 'green' heat source such as a resistance heater, an inductance heater, an arc heater, a laser, and/or gas heating, or a combination thereof. As used herein, 'green' is generally defined as 'renewable and not harmful to the environment' as applied to energy and resources. Energy is typically supplied via green sources, such as by electricity generated by solar, wind, hydroelectric, and/or nuclear sources.

The dolomite precursor is prepared by stoichiometrically mixing dolomite, a calcium carbide ($CaC_2$) reducing agent, and $Ca(F_2)$ catalyst to yield a homogenous admixture; the admixture is typically introduced into the apparatus 10 in pellet form both for ergonomic convenience and to maximize useful surface area. The admixture usually has CaF2 catalyst added at about three weight percent.

In the above reaction (Eq. 1), $CaF_2$ is assumed to not participate as it is a catalyst; in reality, $CaF_2$ breaks down over extended cycles and while the formation of CaO contribute to the expected reactive output, minute amounts of $F_2$ are released that will eventually degrade the refractory components of the system 10, necessitating their eventual replacement.

Calcium oxide produced in the above reaction is typically further treated with added carbon at elevated temperature (about 1600 to 2000 degrees Celsius) to yield $CaC_2$ according to

$$2CaO + 4C \Rightarrow 2CaC_2 + O_2 \qquad (3)$$

and the resultant $CaC_2$ is either reused in the reduction of dolomite and/or sold for profit. Likewise, the $CO_2$ generated during the reduction of dolomite is collected and sold for profit. Any excess $CO_2$ as well as partially reacted CO generated by the process may be collected and disposed of according to industry protocol, such as disposal in a certified well site or the like. Virtually all of the generated carbon, mostly as $CO_2$ with some CO, is captured and either recycled into the process as $CaC_2$ and $CO_2$, sold as excess $CaC_2$ and/or $CO_2$, or disposed of according to protocol. The instant process enjoys a significantly reduced carbon footprint (approaching zero) in operation, energy sourcing, and raw material acquisition. The instant process has a carbon efficiency of at least 80 percent, more typically at least 90 percent, and still more typically at least 95 percent.

Metallic magnesium crowns as collected have a reasonably high purity level, typically at least about 80 percent pure, more typically about 90 percent pure, and may then be smelted and further purified to yield metallic magnesium ingots. Further, the metallic magnesium ingots so produced have significantly less caustic Fe, Si, Ni, and Cu impurities therein and have a greater concentration of Ca therein than do conventionally (Pidgeon process) produced magnesium ingots, and typically do not require subsequent purification steps. This is due to the avoidance of ferrosilica as a reducing agent in favor of calcium carbide.

Figure 12:
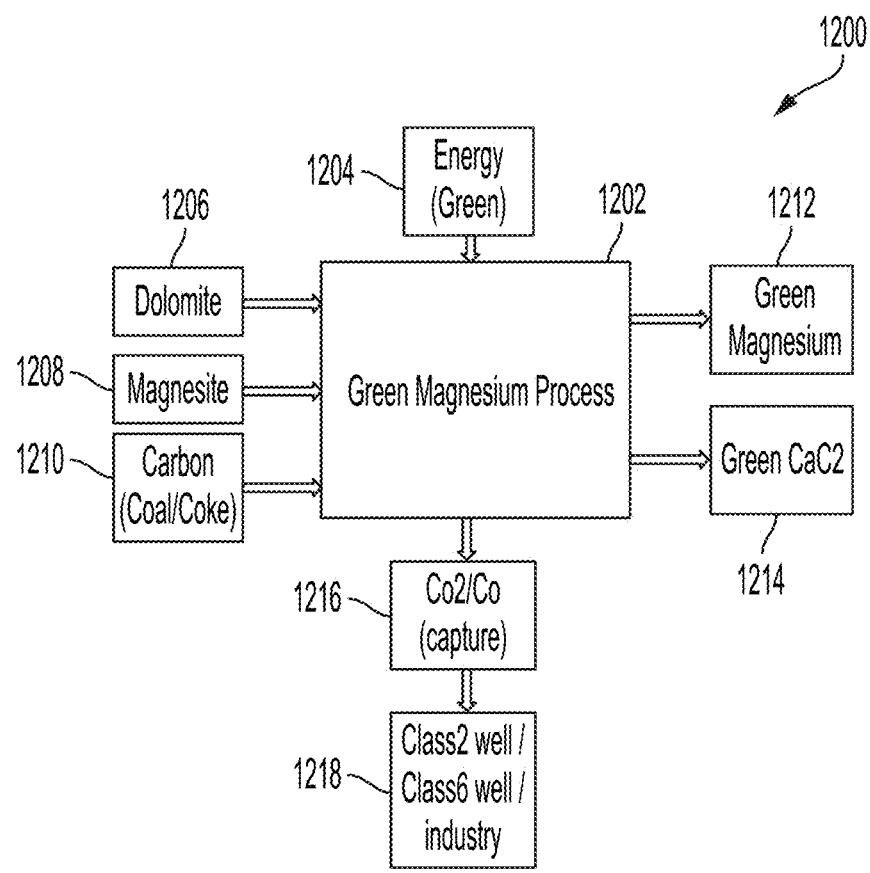
FIG. 12 is a first process flow chart using the equipment detailed in FIGS. 1-11 to extract magnesium metal from a mineral.

Referring now to FIG. 12, one embodiment of a first process flow chart 1200 using the equipment detailed in FIGS. 1-11 to extract magnesium metal from a mineral is illustrated. The flow chart 1200 may generally be directed to a green magnesium process 1202 wherein energy 1204 is input into the process, along with dolomite 1206, magnesite 1208, and carbon 1210 to isolate magnesium 1212, among other things, as discussed herein. Other outputs of the green magnesium process 1202, such as $CaC_2$ 1214 and $CO_2/CO$ gas 1216, are further processed as discussed herein.

In the green magnesium process 1202, dolomite 1206 and magnesite 1208 are procured via a green pretreatment and mining operation. The dolomite 1206 and magnesite 1208 are calcined in a calcining furnace powered by green sourced energy 1204. The calcined dolomite and magnesite precursors, along with $CaC_2$ precursor and $CaF_2$ catalyst are blended, pelletized, and placed into a reduction chamber. Heat generated in a green manner (such as by resistance heating, inductance heating, arc heating, tuned laser heating, and/or a combination of the above) from green energy 1204 sources (solar, wind, hydroelectric, and/or nuclear, among others) is directed into the reduction chamber to react the precursors to yield magnesium vapor, $CO_2/CO$ gas 1216, and slag. The magnesium vapor is screened and directed to a condensation surface where metallic magnesium crowns are precipitated. The $CO_2/CO$ gasses 1216 generated during calcination and reduction operations are vented and captured 1218, and the slag is collected for removal at the end of the magnesium extraction process.

The precipitated and condensed magnesite crowns are typically automatically removed from the reduction chamber and melted under a nonoxidizing cover gas to yield magnesium ingots The cover gas is typically mostly CO2, typically captured as generated during the calcination an reduction steps and recycled herein. The cover gas may also include nitrogen, argon, SO2, HFC-134a (1,1,1,2-tetrafluoroethane), HFC-7100 (methoxy-nonafluorobutane), and/or Novec™ 612 (pentafluoroethylhepafluoroisopropylketone) gases, and the cover gas atmosphere prevents oxidation of the magnesium as the crowns are melted and formed into ingots.

Extracted slag is mixed with carbon and heated with green-sourced heat energy to yield $CaC_2$ 1214 and $CO_2/CO$ 1216 (which is collected and recycled and/or disposed of as described above). Some of the so-produced CaC2 1214 is recycled back into the magnesium extraction process, and any excess is sold commercially. Any remaining slag byproducts, such as aluminosilicates, alumina, silica, and the like, may be further refined for commercial resale or disposed of according to the proper protocols.

In some embodiments, the instant metal extraction process has a very low carbon footprint, and in some of those embodiments the metal extraction process has zero carbon footprint. It is possible to reduce expenses and enhance revenue from using the instant process by commercializing byproducts such as $CaC_2$ and $CO_2$, in addition to using the same as made through the process as initial starting materials for future cycles of the process. Also, as the process is green, carbon credits offered by government entities may be sold to others in this or other industries not meeting their green obligations to further enhance revenue.

Figure 13:
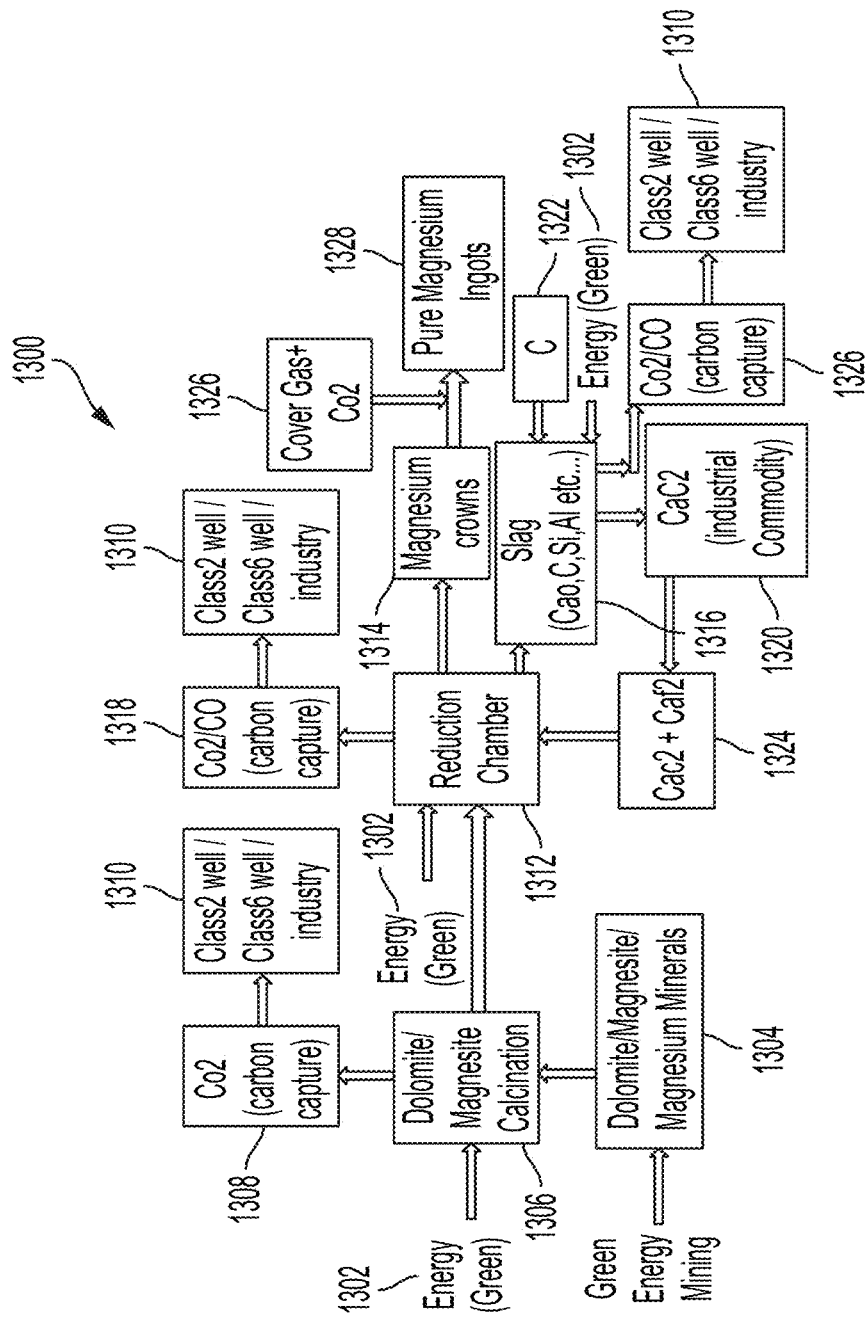
FIG. 13 is a second process flow chart using the equipment detailed in FIGS. 1-11 to extract magnesium metal from dolomite.

Referring now to FIG. 13, one embodiment of a green magnesium extraction process 1300 is provided whereby dolomite, magnesite, and carbon are provided as input materials, along with input energy (heat) and green metallic magnesium and CaC2 are yielded, along with CO2 (which may be recycled back into the process and/or captured for resale and/or disposed of in a storage well or the like) and CO which is disposed of in a storage well or the like. More specifically, energy 1302 is applied to one or more of dolomite, magnesite, magnesium minerals 1304 in box 1306 to extract magnesium vapor, among other things, therefrom. The energy 1302 applied to the extraction process 1300 may be obtain from green energy sources to ensure the entire process 1300 has a minimized or totally negated carbon footprint compared to conventional systems in the same field of endeavor. As part of the green initiative of the extraction process 1300, any CO2 generated in box 1306 is captured 1308 and specifically directed to an authorized facility 1310.

After the dolomite, magnesite, magnesium minerals 1304 have been processed in box 1306, the reduction chamber 1312 may condense or otherwise isolate magnesium crowns 1314. Other outputs of the reduction chamber 1312 may be slag (Cao, C, Si, Al etc.) 1316 and Co2/CO 1318 as discussed herein. The Co2/CO 1318 may be processed to an authorized facility 1310 similar to the captured C02 1308 discussed herein. The slag 1316 may be further processed to generate CaC2 1320 with the addition of C 1322 and energy 1302. The CaC2 1320 may be further processed with CaF2 in box 1324 and reintroduced into the reduction chamber 1312. Any Co2/CO gas 1326 in the slag 1316 may be captured and specifically directed to of the authorized facilities 1310 for further processing. The magnesium crowns 1314 may be processed via a cover gas (CO2) 1326 to produce pure magnesium ingots 1328.

Figure 14:
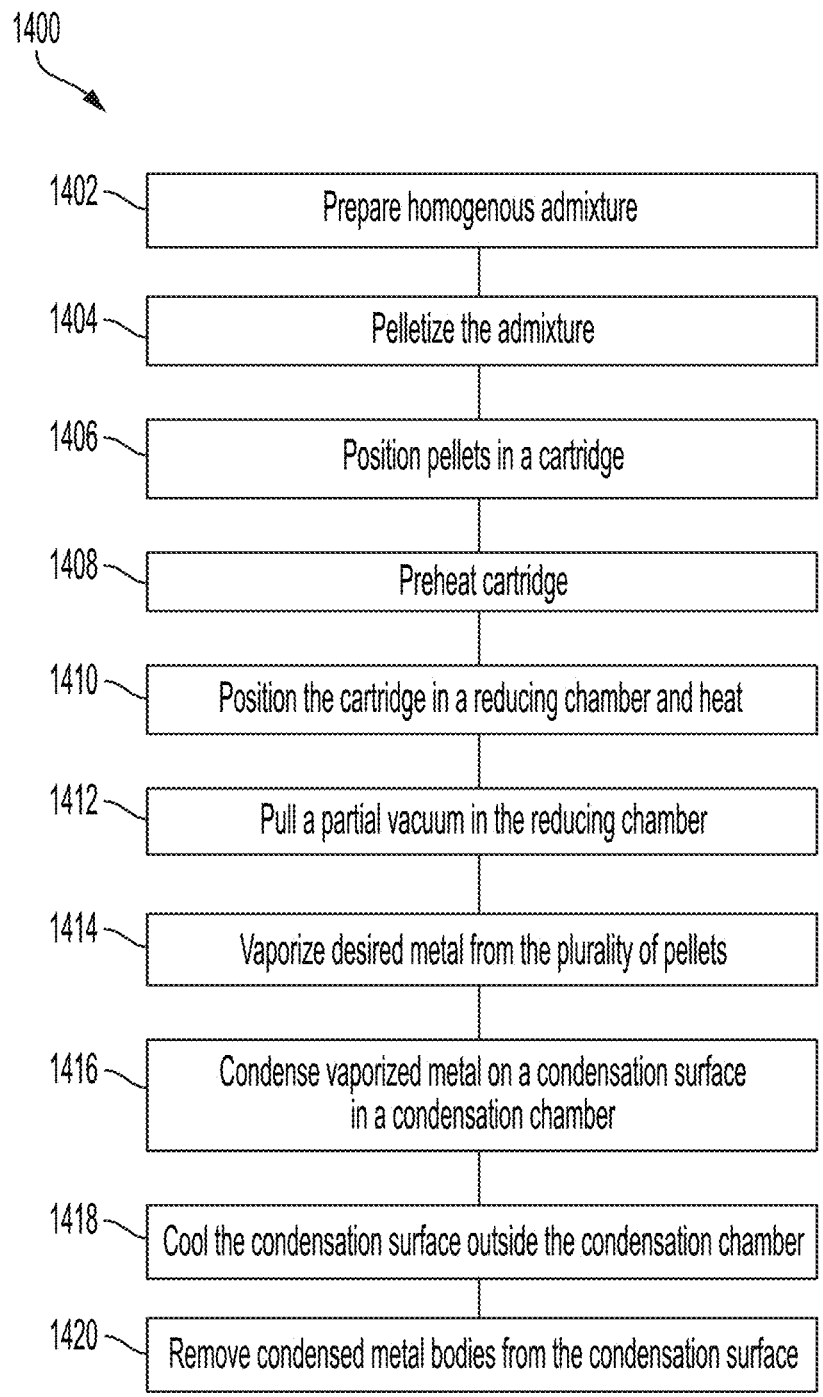
FIG. 14 is a flowchart of one embodiment of a metal extraction process of this disclosure.
Figure 15:
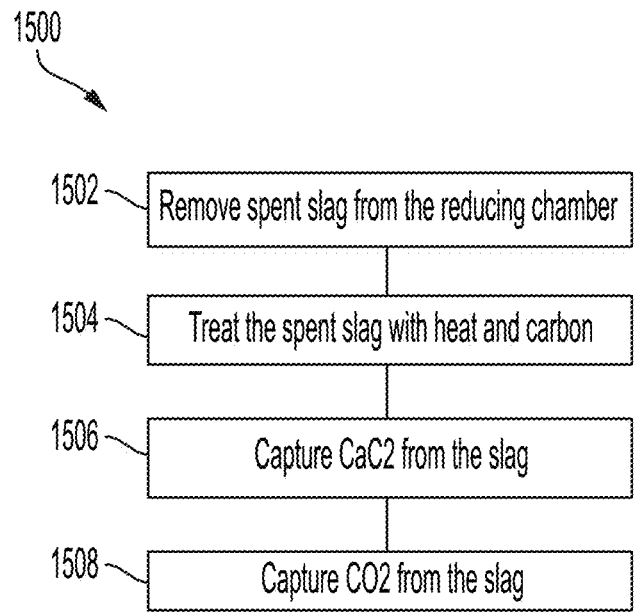
FIG. 15, is a flowchart of one embodiment of a slag processing system of this disclosure.
Figure 16:
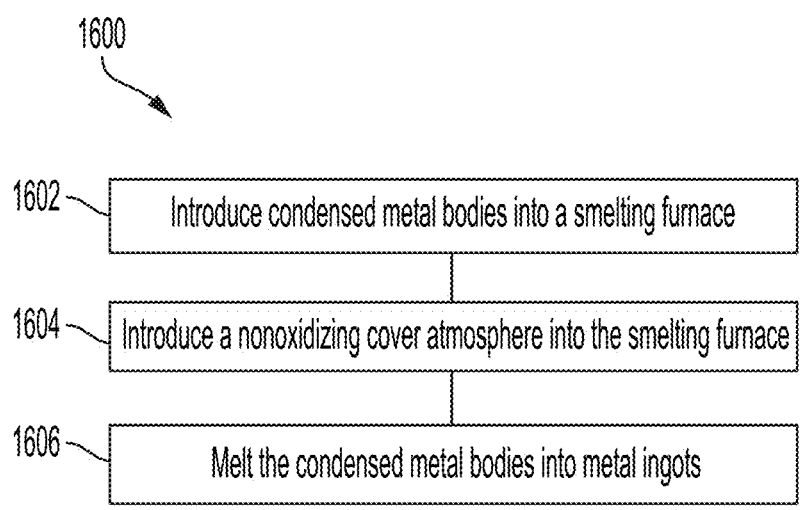
FIG. 16 is a flowchart of one embodiment of a smelting process of this disclosure.

Referring now to FIG. 14, one embodiment of a metal extraction process 1400 is illustrated. The metal extraction process 1400 may include preparing a homogeneous admixture of metal oxide powder, reducing agent powder, and catalyst powder 1402, pelletizing the admixture to yield a plurality of pellets 1404, positioning the plurality of pellets in a cartridge 1406 (and preheating the cartridge 1408 in certain embodiments), positioning the cartridge in a reducing chamber and heating the reducing chamber to a reducing temperature 1410, pulling a partial vacuum in the reducing chamber 1412, vaporizing desired metal from the plurality of pellets 1414, condensing vaporized metal on a condensation surface positioned in a condensation chamber in pneumatic communication with the reducing chamber 1416, cooling the condensation surface outside the condensation chamber 1418, and removing condensed metal bodies from the condensation surface 1420. The metal extraction process 1400 may implement any of the methods and devices disclosed herein or otherwise known by a person have skill in the art at the priority date of this disclosure to implement these teachings.

In one aspect of this disclosure, the metal extraction process 1400 may use a metal oxide that is dolomite. In this aspect, the reducing agent may be calcium carbide, the catalyst powder may be calcium fluoride, and the reducing temperature may be about 1200 degrees Celsius.

In another aspect of the metal extraction process 1400 that utilizes preheating the cartridge 1408, the preheating the cartridge step 1408 is accomplished by placing the cartridge in thermal communication with a hot condensation surface during the cooling the condensation chamber step 1418.

In yet another aspect of the metal extraction process 1400 the metal oxide powder is selected from the group comprising dolomite [$CaMg(CO_3)_2$], magnesite [$MgCO_3$], magnesium chloride [$MgCl_2$], brucite [$Mg(OH)_2$], brushite [$CaHPO_4 \cdot 2H_2O$], hematite [$Fe_2O_3$], huntite [$Mg_3Ca(CO_3)$], calcium aluminates, and combinations thereof.

In another aspect of the metal extraction process 1400 the heating the reducing chamber to a reducing temperature 1410 step uses heat from a heater selected from the group of one or more of an inductance heater, a resistance heater, and arc heater, a laser, and combinations thereof. In one aspect of this embodiment, the heater is powered by electricity from green source. In general, the metal extraction process 1400 has a low carbon footprint by implementing the teachings discussed herein relative to other related processes. In one example, the metal extraction process 1400 has zero carbon footprint.

In yet another aspect of the metal extraction process 1400, the slag may be further processed to utilize the byproducts produced by the metal extraction process 1400 as outlined in a slag processing flowchart 1500. For example, the metal extraction process 1400 may include removing spent slag from the reducing chamber 1502, treating the spent slag with heat and carbon 1504 to generate $CaC_2$ and $CO_2$, capturing $CaC_2$ from the slag 1506, and capturing $CO_2$ from the slag 1508. In this example, the captured $CaC_2$ and $CO_2$ may be commercialized through known commercial options.

Yet another aspect of the metal extraction process 1400 considers further processing material in a smelting furnace as outlined in the process 1600. This process 1600 may include introducing condensed metal bodies into a smelting furnace 1602, introducing a nonoxidizing cover atmosphere into the smelting furnace 1604, and melting the condensed metal bodies into metal ingots 1606. In this embodiment, the cover atmosphere may be at least eighty percent carbon dioxide with the remainder selected from the group consisting of nitrogen, Novec™ 612, sulfur dioxide, HFC-134a, HFC-7100, and combinations thereof.

In yet another aspect of the metal extraction process 1400, the metal oxide powder is calcined before the homogeneous admixture is prepared in box 1402.

Thus, while the disclosure has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

The invention claimed is:
1. A metal extraction process comprising:
   a) preparing a homogeneous admixture of metal oxide powder, reducing agent powder, and catalyst powder;
   b) pelletizing the admixture to yield a plurality of pellets;
   c) positioning the plurality of pellets in a cartridge;
   d) positioning the cartridge in a reducing chamber;
   e) heating the reducing chamber to a reducing temperature;
   f) pulling a partial vacuum in the reducing chamber;
   g) vaporizing desired metal from the plurality of pellets;
   h) condensing vaporized metal on a condensation surface positioned in a condensation chamber in pneumatic communication with the reducing chamber;
   i) cooling the condensation surface outside the condensation chamber;
   j) removing condensed metal bodies from the condensation surface;
   k) removing spent slag from the reducing chamber;
   l) treating the spent slag with heat and carbon to generate $CaC_2$ and $CO_2$;
   m) capturing $CaC_2$ from the slag;
   n) capturing $CO_2$ from the slag;
   o) introducing condensed metal bodies into a smelting furnace;
   p) introducing a nonoxidizing cover atmosphere into the smelting furnace; and
   q) melting the condensed metal bodies into metal ingots; wherein:
   the cover atmosphere is at least eighty percent carbon dioxide with the remainder selected from the group consisting of nitrogen, pentafluoroethylhepafluoroisopropylketone (Novec™ 612), sulfur dioxide, 1,1,1,2-tetrafluoroethane (HFC-134a), methoxy-nonafluorobutane (HFC-7100), and combinations thereof, and
   at least a portion of the cover atmosphere is recycled into the smelting furnace from a portion of the metal extraction process.

2. The metal extraction process of claim 1 wherein the metal oxide is dolomite; wherein the reducing agent is calcium carbide; wherein the catalyst powder is calcium fluoride; and wherein the reducing temperature is about 1200 degrees Celsius.

3. The metal extraction process of claim 1 and further comprising: n) preheating the cartridge.

4. The metal extraction process of claim 3, wherein preheating the cartridge is accomplished by placing the cartridge in thermal communication with a hot condensation surface during step i).

5. The metal extraction process of claim 1 wherein the metal oxide powder is selected from the group consisting of dolomite [$CaMg(CO_3)_2$], magnesite [$MgCO_3$], magnesium chloride [$MgCl_2$], brucite [$Mg(OH)_2$], brushite [$CaHPO_4 \cdot 2H_2O$], hematite [$Fe_2O_3$], huntite [$Mg_3Ca(CO_3)$], calcium aluminates, and combinations thereof.

6. The metal extraction process of claim 1 wherein a porous separator is operationally connected between the reducing chamber and the condensation chamber.

7. The metal extraction process of claim 1, wherein step e) uses heat from a heater comprising an inductance heater, a resistance heater, an arc heater, or a laser, or combinations thereof.

8. The metal extraction process of claim 7, wherein during step e) the heater is powered by electricity from a green source.

9. The metal extraction process of claim 1, and further comprising:
(i) prior to step (a), the metal oxide powder is calcined.

10. A system for performing the metal extraction process of claim 1 comprising:
a magnesium extractor comprising a heating block and a condenser-separator, the condenser separator including each of the reducing chamber and the condensation chamber, and wherein the condenser separator is position at least partially within the heating block.

11. The system of claim 10, wherein the magnesium extractor further comprises a removable platform slidably mounted on a rail, the platform configured to support the cartridge containing the pellets, a plurality of separator screens, and a cylindrical receiver, and operable to move each of the cartridge, separator screens, and cylindrical receiver into and out of the heating block and the condenser-separator as a single unit.

12. A metal extraction process comprising:
a) preparing a homogeneous admixture of dolomite metal oxide powder, calcium carbide reducing agent powder, and calcium fluoride catalyst powder;
b) pelletizing the admixture to yield a plurality of pellets;
c) positioning the plurality of pellets in a cartridge;
d) positioning the cartridge in a reducing chamber;
e) heating the reducing chamber to a reducing temperature;
f) pulling a partial vacuum in the reducing chamber;
g) vaporizing desired metal from the plurality of pellets;
h) condensing vaporized metal on a condensation surface positioned in a condensation chamber in pneumatic communication with the reducing chamber;
i) cooling the condensation surface outside the condensation chamber;
j) removing condensed metal bodies from the condensation surface;
k) removing spent slag from the reducing chamber;
l) treating the spent slag with heat and carbon to generate CaC2 and CO2;
m) capturing CaC2 from the slag;
n) capturing CO2 from the slag; and
o) introducing a nonoxidizing cover atmosphere into the smelting furnace, wherein at least a portion of the nonoxidizing over atmosphere comprises the captured CO2 from of step (n) recycled into the smelting furnace; and
p) melting the condensed metal bodies into metal ingots; wherein:
the cover atmosphere is at least eighty percent carbon dioxide with the remainder selected from the group consisting of nitrogen, pentafluoroethylhepafluoroisopropylketone (Novec™ 612), sulfur dioxide, 1,1,1,2-tetrafluoroethane (HFC-134a), methoxynonafluorobutane (HFC-7100), and combinations thereof.

13. The metal extraction process of claim 12, and further comprising: (i) preheating the cartridge.

14. The metal extraction process of claim 12, wherein preheating the cartridge is accomplished by placing the cartridge in thermal communication with a hot condensation surface during step i).

15. The metal extraction process of claim 12, wherein the metal oxide powder is selected from the group consisting of dolomite [CaMg(CO3)2], magnesite [MgCO3], magnesium chloride [MgCl2], brucite [Mg(OH)2], brushite [CaHPO4·2H2O], hematite [Fe2O3], huntite [Mg3Ca(CO3)], calcium aluminates, and combinations thereof.

16. The metal extraction process of claim 12, wherein a porous separator is operationally connected between the reducing chamber and the condensation chamber.

17. The metal extraction process of claim 12, wherein step e) uses heat from a heater comprising an inductance heater, a resistance heater, an arc heater, or a laser, or combinations thereof.

18. The metal extraction process of claim 15, wherein during step e) the heater is powered by electricity from a green source.

19. The metal extraction process of claim 1, and further comprising: (i) prior to step (a), the metal oxide powder is calcined.

* * * * *